INVENTOR.
MASAO SUGAYA
ATTORNEY

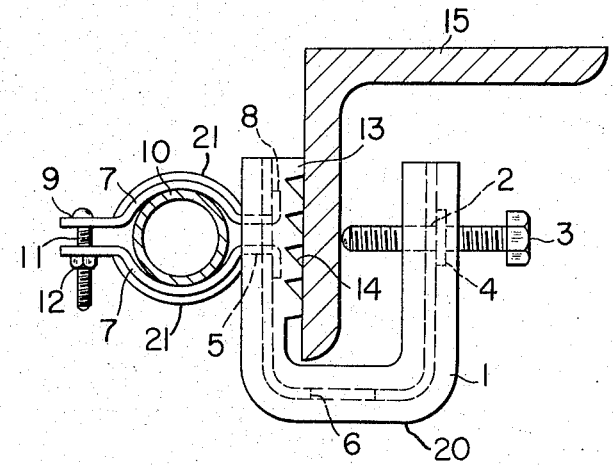
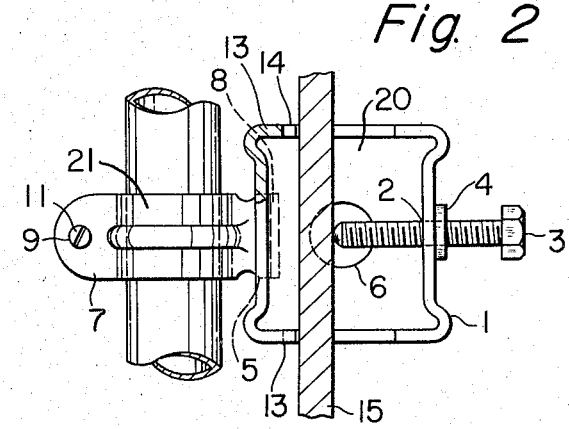
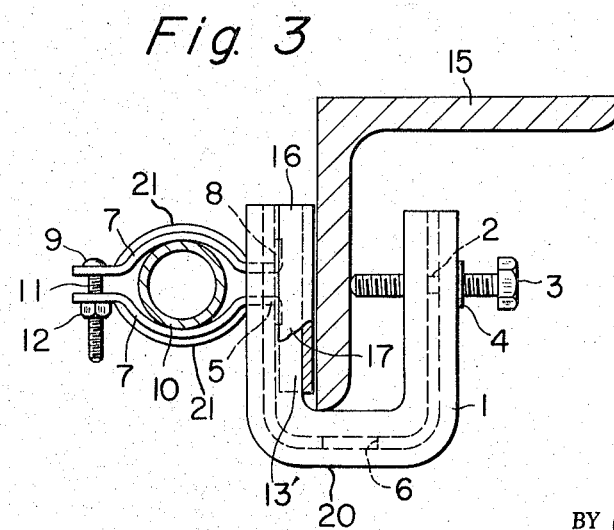

Jan. 31, 1967  MASAO SUGAYA  3,301,513
BEAM CLAMP AND CLIP ASSEMBLIES

Filed May 28, 1965  3 Sheets-Sheet 3

INVENTOR.
MASAO SUGAYA
BY
ATTORNEY.

United States Patent Office 3,301,513
Patented Jan. 31, 1967

3,301,513
BEAM CLAMP AND CLIP ASSEMBLIES
Masao Sugaya, 1365 Higashi Komatsugawa 4-chome, Edogawa-ku, Tokyo, Japan
Filed May 28, 1965, Ser. No. 459,732
4 Claims. (Cl. 248—72)

The present invention relates to improved beam clamp and clip assemblies, and more particularly to improved beam clamp and clip assemblies of the type in which the beam clamps are provided at suitable portions thereof with positive engaging means such as rugged edges or elastic insert members formed of elastic materials such as rubber or vinyl whereby such beam clamp and clip assemblies can be firmly secured to steel beams of buildings.

Up to date, when electric wire conduits, water pipes, steam pipes and other similar members were to be installed in steel-frame buildings, holes were drilled in the steel frames at the points where such conduits and pipes were to be installed and the conduits and pipes were firmly secured to the steel frames by passing securing cables through such drilled holes and winding the cables around the conduits and pipes.

However, since provision of drilled holes in steel building frames resulted in various disadvantages, beam clamps were secured to the conduit installed at various places of the building frame in place of drilled holes and conduit holding clips were then attached to the thus secured beam clamps. Thereafter, conduits were lengthwise inserted into the clips and held in position thereby by tighening the clips with set screws.

The prior art conventional beam clamps were usually formed by pressing sheet metal, but it is well known in the art that when sheet metal is pressed the engaging surfaces of edges of the thus press-formed beam clamps are not always smooth, but very often become somewhat uneven because the metal materials usually elongate unevenly during such pressing operation. Accordingly, when beam clamp and clip assemblies comprising such unevenly surfaced clamps were secured to steel beams or steel frames of buildings, the adjacent engaging surfaces of the beam clamps and building beams could not contact flush to each other thereby reducing the clamping strength of the beam clamps and resulting in reduction of the overall clamping strength of the beam clamp and clip assemblies.

Therefore, one object of the present invention is to provide an improved beam clamp and clip assembly of a type in which the beam engaging surfaces or edges of the beam clamp are provided with serrations or an insert member or members formed of elastic materials such as rubber or vinyl thereby to provide positive securing of the engaging surfaces or edges of the beam clamp to the adjacent engaging surface of a steel beam or frame by the biting action of such serrations into the metal of the adjacent engaging surface of the steel beam or by frictional action of the elastic insert member or members while eliminating disadvantages due to the above-mentioned unevenness in the engaging surfaces or edges of the pressed beam clamp.

Another object of the present invention is to provide an improved beam clamp and clip assembly in which the beam engaging surfaces or edges of the beam clamp are provided with positive engaging means such as serrations, corrugations or other rugged edges forming notches.

Another object of the present invention is to provide an improved beam clamp and clip assembly in which the beam engaging surfaces or edges of the beam clamp are provided with an elastic insert member or members formed of rubber or a suitable type of synthetic resin such as vinyl.

A further object of the present inevntion is to provide an improved beam clamp and clip assembly in which an auxiliary clamp member having one surface adapted to engage the rugged edges of the beam clamp and the other surface adapted to engage the engaging surface of a steel building beam whereby positive securing of the beam clamp to the building beam can be obtained.

The above and other objects, features and attendant advantages of the present invention will be apparent to those skilled in the art from a reading of the following detailed description of the invention in conjunction with the accompanying drawings.

In the drawings:

FIG. 1 is a side elevational view of a preferred form of beam clamp and clip assembly embodying the present invention showing a conduit held by the clip member of the assembly and a steel building beam to which said assembly is secured in section;

FIG. 2 is a top plane view of said assembly of FIG. 1 showing portion thereof in section;

FIG. 3 is similar to FIG. 1, but shows a modified form of beam clamp and clip assembly embodying the present invention;

Figure 4:
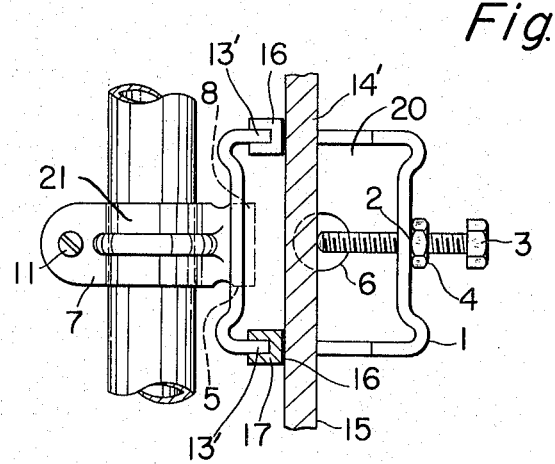
FIG. 4 is a top plane view of said assembly of FIG. 3 showing portion thereof in section.

Referring now to FIGS. 1 and 2 in which a preferred embodiment of the present invention is shown, the beam clamp and clip assembly comprises a U-shaped clamp member 1 one leg portion of which has a through bore 2 through which a cap screw 3 passes and the other leg portion of which has a through bore 5, the two leg portions being interconnected by a web portion 20 having a through bore 6, and a clip member composed of two conduit holding pieces 7 and 7 each of which has an outwardly and horizontally extending first or abutment end portion 8 which is adapted to be inserted into the bore 5 in the other leg portion or the bore 6 in the web portion of the clamp member as desired thereby to secure the clip member to the beam clamp member 1. Each of the conduit holding pieces 7 and 7 has an outwardly curved intermediate portion 21 which is integral with the abutment end portion 8 and a straight second end portion which is integral with the curved intermediate portion having a through bore 9 through which a cap screw 11 having a nut 12 thereon extends. The intermediate portions 21 define a space therebetween for holding a pipe or conduit 10 in cooperation with the other intermediate portion of the holding piece and the pipe is lengthwise inserted into the space. After the pipe 10 has been inserted into the space, a nut 12 threaded on the cap screw 11 is tightened thereby causing holding pieces 7 and 7 to firmly hold the pipe 10 in position. The inner edge 13 of the other clamp leg portion facing the tip end of the cap screw 3 are provided with serrations as indicated by numeral 14.

Numeral 15 designates an angular steel beam of a building (not shown) and the angular steel beam is adapted to be engaged by the serrations 14 on one surface and by the cap screw 3 on the other surface. Thus, when nut 4 threaded on cap screw 3 is tightened, beam clamp 1 can be firmly secured to the angular steel beam 15 by means of serration 14 for prevention of slidable movement relative to the angular steel beam. The pipe 10 may be in a form of an electric wire conduit, water pipe or steam pipe. The serrations 14 may be replaced by corrugations or the like rugged edge forming means as the case may be.

With the above construction and arrangement of various parts, serrated inner edges 13 of one leg portion of the beam clamp 1 and the cap screw 3 can abut against the opposite surfaces of the angular steel beam 15 with a quite strong force and firmly grip the angular steel beam 15 therebetween. After the beam clamp and clip assembly has been attached to the beam it will stay in position until intentionally removed therefrom.

Figure 5:
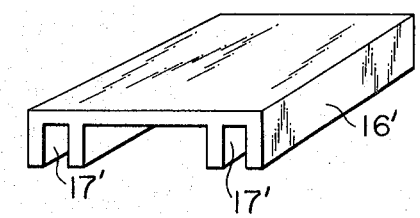
FIG. 5 is a fragmentary perspective view of a modified elastic insert member to be employed in said modified embodiment of assembly in FIG. 3.

Next, referring to FIGS. 3 to 5 inclusive in which a modified embodiment of the present invention is shown.

This modified embodiment is substantially the same as the preferred embodiment as described hereinabove except that the inner edges of one leg portion of the beam clamp in this modified embodiment are not provided with serrations and in place of the serrations, an elastic insert member or members are put on the inner edge. Therefore, the identical and corresponding parts are indicated by the same numerals.

As shown in FIGS. 3 and 4, the modified beam clamp and clip assembly comprises a U-shaped clamp member 1 one leg portion of which has a through bore 2 through which a cap screw 3 passes and the other leg portion of which has a through bore 5 for receiving the clip member, the two leg portions being interconnected by a web portion having a bore 6 for receiving a clip member, and a clip member composed of two pipe holding pieces 7 and 7 each of which has an outwardly and horizontally extending first or abutment end portion 8 which is adapted to be inserted into the bore 5 in the other portion or the bore 6 in the web portion of the clamp member 1 as desired thereby firmly securing the clip member to the beam clamp member 1. Each of the holding pieces 7 and 7 has an outwardly curved intermediate portion which is integral with the first end portion 8 and a straight second end portion which is continuous to the curved intermediate portion having a through bore 9 through which a cap screw 11 having a nut 12 thereon extends. The intermediate portions define a space therebetween for holding a pipe 10 such as an electric wire conduit in cooperation with the intermediate portion of the other holding piece and the pipe is lengthwise inserted into the space. After the pipe 10 has been inserted into the space a nut 12 threaded on the cap screw 11 is tightened thereby causing holding pieces 7 and 7 to firmly hold the pipe 10 in position. The above construction and arrangement of various parts are the same as those of the preferred embodiment, but the inner edges 13' of one leg portion of the beam clamp 1 are not provided with serrations 14 which are provided on one leg portion edges of the beam clamp in the preferred embodiment. Instead, each of the inner edges 13' on the one leg portion has a U-shaped elastic insert member 16 put thereon and each of the elastic insert members is provided with groove 17 defined by the two leg portions thereof as shown in FIG. 4. Alternatively, the elastic insert members 16 may be replaced by a single U-shaped insert member 16' having grooves 17' and 17' for engaging the respective edges 13 in the other leg portion of the clamp member as shown in FIG. 5.

The manner in which this modified beam clamp and clip assembly is secured to the angular steel beam 15 is substantially the same as described in connection with the preferred embodiment. That is, a nut 4 threaded on the cap screw 3 is tightened so as to force the tip end of the screw against one surface of the angular beam 15 and to force the adjacent surfaces of the insert members 16 against the opposite surface of the beam with a strong force whereby the assembly can be firmly secured to the angular beam.

Figure 6:
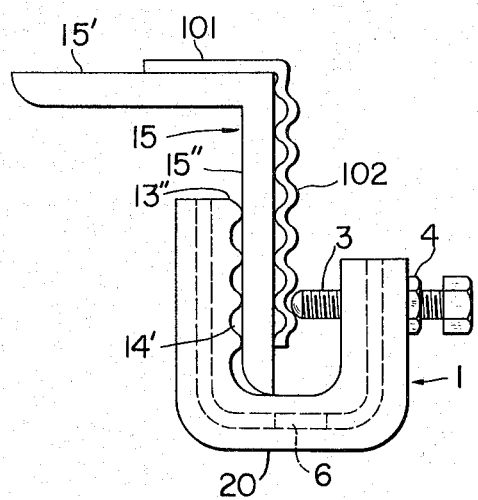
FIG. 6 is a fragmentary side elevational view of a further modified form of clamp member embodying the present invention.
Figure 7:
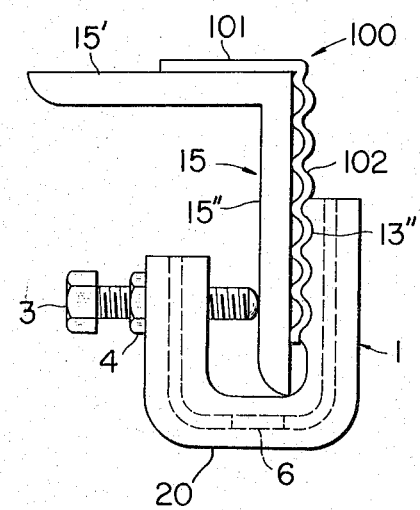
FIG. 7 is a fragmentary side elevational view of said embodiment of FIG. 6 showing when said clamp member is disposed in the position opposed to the position thereof in FIG. 6.
Figure 8:
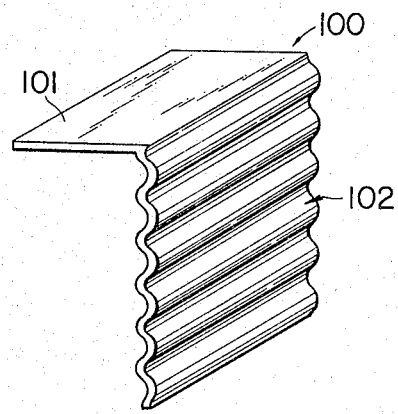
FIG. 8 is a fragmentary perspective view of an auxiliary beam clamp member employed in said embodiment of FIG. 6.

Turning to FIGS. 6 to 8 inclusive in which a further modified embodiment of the present invention is shown. As seen from these figures, this embodiment is substantially the same as shown in FIGS. 1 and 2 except that an auxiliary beam clamp member is provided and the inner edges of one leg portion of the clamp member are corrugated in the embodiment of FIGS. 6 to 8 inclusive. Therefore, the identical and corresponding parts are indicated by the same numerals and description of parts which are not concerned with this auxiliary clamp member are omitted. As seen from FIGS. 6 to 8, the auxiliary beam clamp member is in an angle form and generally indicated by numeral 100. The auxiliary clamp member 100 has a first flat portion 101 adapted to ride on the top of one portion 15' of the angular beam 15 and a second portion 102 extending perpendicular to the first portion 101 for abut engagement of the other portion 15" of the beam 1 and having corrugated opposing surfaces whose contour corresponds to the contour of the corrugated edges 13" of one leg portion of the beam clamp member 1. The contour of the opposing surfaces of the second portion 102 may be of a serrated or angular configuration other than the illustrated corrugated contour depending upon the configuration of the above-mentioned leg edges of the clamp member 1.

As is clearly shown in FIG. 6, cap screw 3 for clamp member 1 is adapted to engage in any one of the corrugations on the outer surface of the second portion 102 and to firmly grasp the other portion 15" of the angular beam 15 in cooperation with the corrugated leg edges 13 of the clamp member 1. Simultaneously slidable movement of the auxiliary clamp member 100 in the vertical direction can be effectively prevented by the action of the first flat portion 101.

FIG. 7 shows a condition different from the condition in FIG. 6. In FIG. 7, the clamp member 1 is positioned in the opposite position to that of the clamp member in FIG. 6 and the corrugated leg edges 13 of clamp member 1 engage the corrugated surface 102 of auxiliary clamp member 100. Thus, clamp member 1 can be effectively prevented from vertical movement by tightening nut 4 threaded on cap screw 3.

While a few embodiments of the prevent invention have been shown and described in detail, it will be understood that the same are for purpose of illustration only and are not to be taken as limiting the scope of the invention, reference being had for this purpose to the appended claims.

What is claimed is:

1. A beam clamp and clip assembly for holding a pipe to a beam of a building comprising, a U-shaped beam clamp member having one leg portion provided with a tapped bore, the other leg portion provided with a clip receiving bore, and an intermediate portion having a clip receiving bore; a first tightening means threaded in said tapped bore; a clip member composed of two pipe holding pieces each of which has a bent end portion engaged in said clip receiving bore, a curved intermediate portion defining a space for receiving the pipe in cooperation with the curved intermediate portion of the other pipe holding piece and a straight end portion provided with a bore; and a second tightening means for tightening said clip member with a nut in said bore; characterized in that said U-shaped beam clamp member is formed in integral, and said other leg portion includes an inner edge on which an elastic insert member for engagement with the beam of the building opposite the tip end of said first tightening means is disposed, said elastic member having a groove to fit on said edge thereby.

2. The beam clamp and clip assembly of claim 1 wherein the bent end portions of said clip member extend outwardly in opposite directions.

3. A beam clamp and clip assembly for holding a pipe to a beam of a building comprising, a U-shaped beam clamp member having one leg portion provided with a tapped bore, the other leg portion provided with a clip receiving bore, and an intermediate portion having a clip receiving bore; a first tightening means threaded in said tapped bore; a clip member composed of two pipe holding pieces each of which has a bent end portion engaged in said clip receiving bore, a curved intermediate portion defining a space for receiving the pipe in cooperation with the curved intermediate portion of the other pipe holding piece and a straight end portion provided with a bore; a second tightening means for tightening said clip member with a nut in said bore; characterized in that said U-shaped beam clamp member is formed in integral, and said other leg portion includes an inner edge having a corrugated form for engagement with the beam of the building opposite the tip end of said first tightening means, said corrugated form being formed in integral with said other leg portion; and including an auxiliary clamp member having an angle form comprising one portion being flattened to engage with one side of the angular beam of the building, and the other portion having a corrugated form for placement between one leg portion and a beam and whose contour substantially corresponds to that of said inner edge of the other leg portion of the U-shaped beam clamp member.

4. The beam clamp and clip assembly of claim 3 wherein the bent end portions of said clip member extend outwardly in opposite directions.

References Cited by the Examiner

UNITED STATES PATENTS

| | | | |
|---|---|---|---|
| 1,237,525 | 8/1917 | Keator | 25—13.5 |
| 1,672,720 | 6/1928 | Horsfall | 248—72 |
| 1,774,878 | 9/1930 | Fitzpatrick | 248—72 |
| 1,878,850 | 9/1932 | Hilgers | 108—28 |
| 2,179,406 | 11/1939 | Fitzpatrick | 248—68 |
| 2,375,513 | 5/1945 | Bach | 248—59 |
| 2,385,209 | 9/1945 | Joyce | 248—72 X |
| 2,470,439 | 5/1949 | Kohler | 248—4 |
| 2,483,012 | 9/1949 | Koon | 248—42 |

FOREIGN PATENTS

| | | |
|---|---|---|
| 131,472 | 2/1949 | Australia. |
| 462,115 | 7/1928 | Germany. |
| 619,601 | 3/1949 | Great Britain. |

CLAUDE A. LE ROY, *Primary Examiner.*